(12) United States Patent
Wu

(10) Patent No.: US 9,250,464 B2
(45) Date of Patent: *Feb. 2, 2016

(54) CARBON NANOTUBE TOUCH PANEL HAVING TWO CARBON NANOTUBE FILMS

(71) Applicant: TIANJIN FUNAYUANCHUANG TECHNOLOGY CO., LTD., Tianjin (CN)

(72) Inventor: Ho-Chien Wu, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 92 days.

This patent is subject to a terminal disclaimer.

(21) Appl. No.: 13/972,947

(22) Filed: Aug. 22, 2013

(65) Prior Publication Data

US 2014/0055686 A1    Feb. 27, 2014

(30) Foreign Application Priority Data

Aug. 24, 2012  (CN) .......................... 2012 1 0304609

(51) Int. Cl.
```
G06F 3/041     (2006.01)
G02F 1/1333    (2006.01)
B82Y 15/00     (2011.01)
B82Y 30/00     (2011.01)
```

(52) U.S. Cl.
CPC ............ *G02F 1/13338* (2013.01); *B82Y 15/00* (2013.01); *B82Y 30/00* (2013.01); *G06F 3/041* (2013.01); *G06F 2203/04112* (2013.01); *Y10S 977/742* (2013.01); *Y10S 977/953* (2013.01)

(58) Field of Classification Search
CPC ................................ G06F 3/041–3/047; G06F 2203/041–2203/04113

USPC .......... 345/173–178; 178/18.01–18.09, 18.11
See application file for complete search history.

(56) References Cited

U.S. PATENT DOCUMENTS

| | | | |
|---|---|---|---|
| 2008/0158181 A1* | 7/2008 | Hamblin et al. | 345/173 |
| 2008/0238433 A1* | 10/2008 | Joutsenoja et al. | 324/457 |
| 2009/0153502 A1* | 6/2009 | Jiang et al. | 345/173 |
| 2009/0153509 A1 | 6/2009 | Jiang et al. | |
| 2009/0160799 A1 | 6/2009 | Jiang et al. | |
| 2009/0167710 A1 | 7/2009 | Jiang et al. | |
| 2011/0050627 A1* | 3/2011 | Liao et al. | 345/174 |
| 2011/0227863 A1 | 9/2011 | Cheng et al. | |
| 2011/0234530 A1 | 9/2011 | Kim et al. | |

FOREIGN PATENT DOCUMENTS

| | | |
|---|---|---|
| CN | 101464759 | 6/2009 |
| TW | 201133315 | 10/2011 |

* cited by examiner

*Primary Examiner* — Stephen Sherman
(74) *Attorney, Agent, or Firm* — Novak Druce Connolly Bove + Quigg LLP

(57) ABSTRACT

A touch panel utilizing carbon nanotubes (CNT) includes a base a first CNT film, a second CNT film, and a flexible printed circuit (FPC). The base defines a first touch sensing region, a second touch sensing region, and a gap region. The first CNT film and the second CNT film are respectively positioned on the first touch sensing region and the second touch sensing unit. The FPC is mounted on the base. A plurality of first connection wires are formed on the base, and each first connection wire includes a first electrode, a first wire body and a second electrode. The first electrode is located at the gap region and is connected to both the first CNT film and the second CNT film. The second electrode is attached to the FPC, and the first wire body is connected between the first electrode and the second electrode.

20 Claims, 9 Drawing Sheets

CARBON NANOTUBE TOUCH PANEL HAVING TWO CARBON NANOTUBE FILMS

CROSS-REFERENCE TO RELATED APPLICATIONS

This application claims all benefits accruing under 35 U.S.C. §119 from China Patent Application No. CN201210304609.9, filed on Aug. 24, 2012 in the China Intellectual Property Office, the content of which is hereby incorporated by reference in its entirety. This application is related to commonly-assigned applications entitled, "CARBON NANOTUBE TOUCH PANEL AND TOUCH DISPLAY APPARATUS USING SAME" filed Aug. 22, 2013 Ser. No. 13/972,946, "CARBON NANOTUBE TOUCH PANEL HAVING AT LEAST TWO CARBON NANOTUBE FILMS" filed Aug. 22, 2013 Ser. No. 13/972,948, "CARBON NANOTUBE TOUCH PANEL AND METHOD FOR MAKING SAME" filed Aug. 22, 2013 Ser. No. 13/972,952, "CARBON NANOTUBE TOUCH PANEL AND TOUCH DISPLAY APPARATUS USING SAME" filed Aug. 22, 2013 Ser. No. 13/972,951, "TOUCH PANEL AND TOUCH DISPLAY APPARATUS USING SAME" filed Aug. 22, 2013 Ser. No. 13/972,952, and "TOUCH PANEL AND TOUCH DISPLAY APPARATUS USING SAME" filed Aug. 22, 2013 Ser. No. 13/972,953.

BACKGROUND

1. Technical Field

The present disclosure relates to touch sensing technologies, and more particularly, to a carbon nanotube (CNT) touch panel having two CNT films.

2. Description of Related Art

Touch display apparatus normally include a display assembly and a touch panel attached to the display assembly. Carbon nanotubes (CNT) are used in CNT touch panels because the CNT touch panels are durable. A CNT unit is a carbon nanotube. A CNT touch panel includes a plurality of CNT units arranged in parallel on a substrate. However, conductivity of the CNT unit decreases as a length of the CNT unit increases. This characteristic is a limit in design, and making a CNT touch panel with a large size is problematic.

What is needed is to provide a CNT touch panel that can overcome the above-described limitations.

BRIEF DESCRIPTION OF THE DRAWINGS

The components in the drawings are not necessarily drawn to scale, the emphasis instead being positioned upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
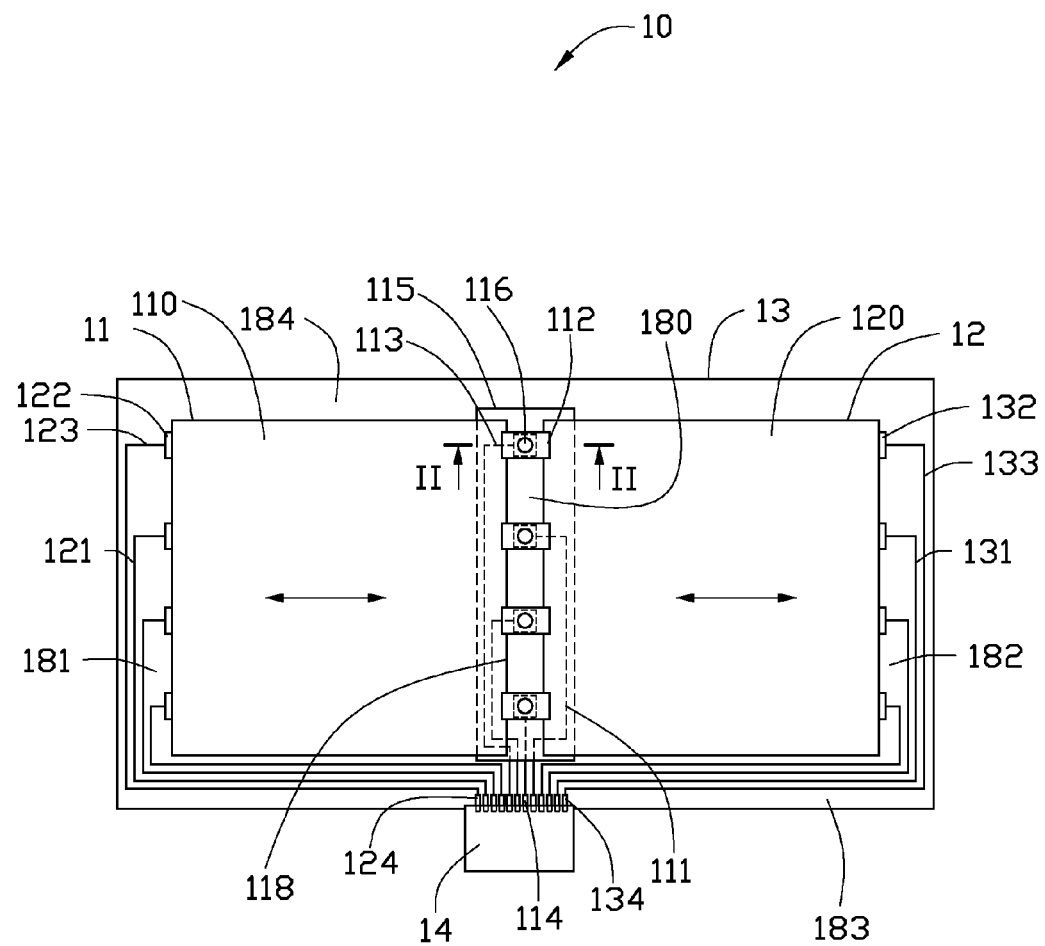
FIG. 1 is a plan view of a CNT touch panel according to a first embodiment of the present disclosure, the CNT touch panel including a gap region.
Figure 3:
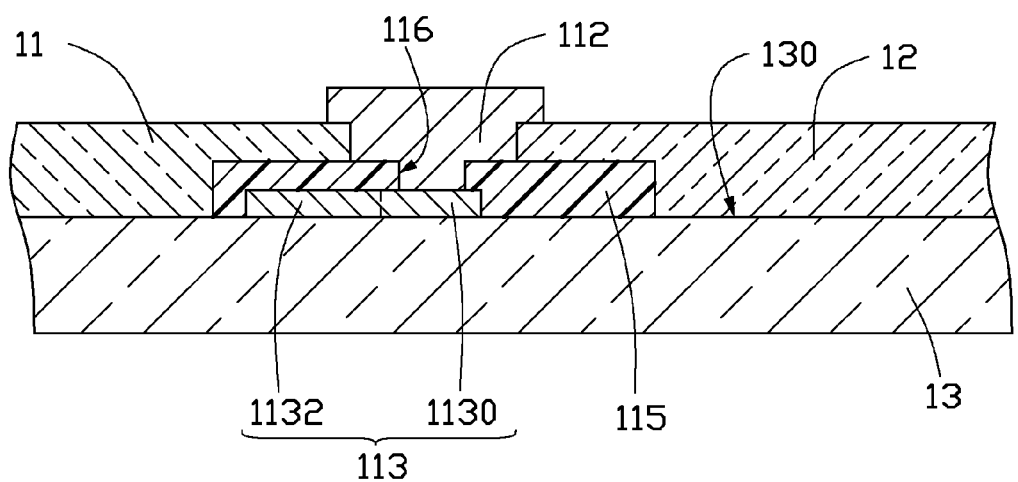
FIG. 3 is a partial, cross-sectional view of the CNT touch panel of FIG. 1, taken from line II-II and showing the gap region.

FIG. 1 shows a CNT touch panel 10 according to a first embodiment of the present disclosure. The CNT touch panel 10 includes a first CNT film 11, a second CNT film 12, a base 13 and a flexile printed circuit (FPC) 14. The base 13 may be a transparent glass substrate or a plastic substrate, which includes a top surface 130 as shown in FIG. 3. The first CNT film 11 and the second CNT film 12 are placed in parallel on the top surface 130 of the base 13.

For example, the base 13 may define a touch area including a first touch sensing region 110, a second touch sensing region 120, and a gap region 180 between the first touch sensing region 110 and the second touch sensing region 120. The first touch sensing region 110 and the second touch sensing region 120 both have a rectangular shape. The first CNT film 11 and the second CNT film 12 are respectively adhered to the first touch sensing region 110 and the second touch sensing region 120. A touch-insensitive gap is formed between the first CNT film 11 and the second CNT film 12 due to the gap region 180.

Figure 2:
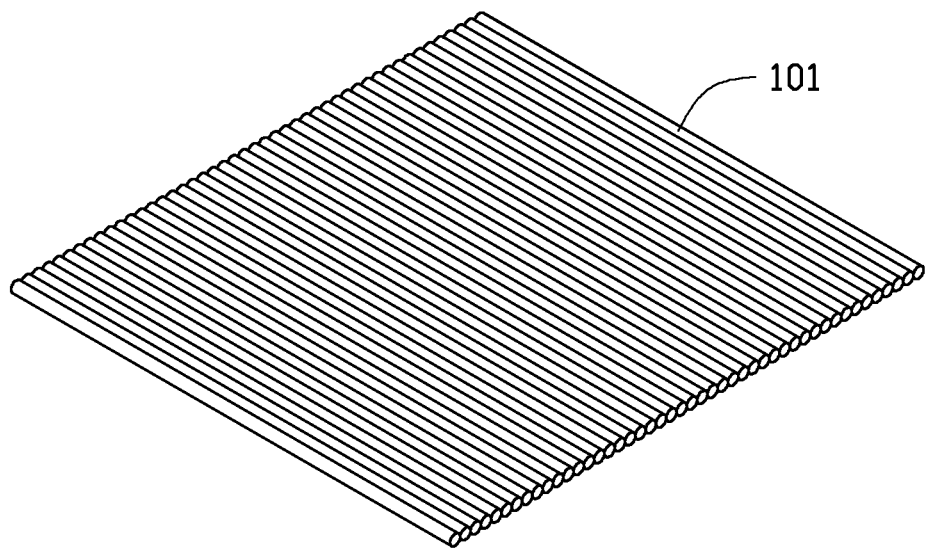
FIG. 2 is a schematic view of a CNT film of the CNT touch panel of FIG. 1.

FIG. 2 shows that each of the first CNT film 11 and the second CNT film 12 includes a plurality of CNT units 101. The CNT units 131 are arranged parallel to each other. In the present embodiment, the CNT units 131 in the first CNT film 11 have a same orientation as the CNT units 101 in the second CNT film 12. The first CNT film 11 and the second CNT film 12 may sense touches applied to the CNT touch panel 10 and generate touch signals in accordance with the applied touches.

The touch area is located in a main central region of the base 13. The base 13 may further define a first side region 181, a second side region 112, a third side region 183 and a fourth side region 184. The first side region 181, the third side region 183, the second side region 182, and the fourth side region 184 are arranged end to end framing the touch area. The first side region 181 and the second side region 182 are located at opposite edges of the base 13, and the third side region 183 and the fourth side region 184 are located at the other two edges of the base 13.

In the embodiment, the first side region 181, the second side region 182, the third side region 183 and the fourth side region 184, and the gap region 185 are all rectangle shaped. The first side region 181 and the second side region 182 are parallel to the gap region 180, the first side region 181 neighbors the first CNT film 11, and the second side region 182 neighbors the second CNT film 12. The third side region 183 and the fourth side region 184 are perpendicular to the gap region 180. The FPC 115 is mounted on and is electrically connected to a middle edge of the third side region 183, and the middle edge of the third side region 183 may be defined as a mounting region. Moreover, the first side region 181, the second side region 182, the third side region 183 and the gap region 180 are defined as wiring regions, in which connection wires can be formed.

The CNT touch panel 10 further includes a plurality of first connection wires 111, a plurality of second connection wires 121, and a plurality of third connection wires 131. The first connection wires 111, the second connection wires 121, and the third connection wires 131 interconnect the CNT films 11, 12 and the FPC 14.

Each of the first connection wires 111 includes a first electrode 112, a first wire body 113 and a second electrode 114. The first electrode 112 is formed at the gap region 180 and is connected to both the first CNT film 11 and the second CNT film 12; in other words, both the first CNT film 11 and the second CNT film 12 are sharing the first electrode 112, and two adjacent first electrodes 112 are arranged in a predefined interval. The second electrode 114 is formed on the mounting region of the third side region 183, and is connected to the FPC 14. The first wire body 113 is connected between the first electrode 112 and the second electrode 114, for example, the first wire body 113 may start from the first electrode 112, extend through the gap region 180 and the third side region 183, and reach the second electrode 114.

In order to ensure insulation between different first connection wires 111, FIG. 3 shows that an insulation layer 115 may be formed at the gap region 180, and two ends of the insulation layer 115 are partly covered by the CNT film 11 and the second CNT film 12 correspondingly. A plurality of conductive holes 116 are formed in the insulation layer 115, each of the conductive holes 116 corresponds to one of the first electrodes 112. Each first wire body 113 is formed on the base 13, and is covered by the insulation layer 115. In particular, the first wire body 113 includes a connection portion 1130 and a transmission portion 1132, the connection portion 1130 is located below a corresponding conductive hole 116, and has a size greater than the conductive hole 116; the transmission portion 1132 is connected between the connection portion 1130 and the second electrode 114. The first electrode 112 is formed on the insulation layer 115, and is electrically connected to the connection portion 1130 via the corresponding conductive hole 116.

Figure 4:
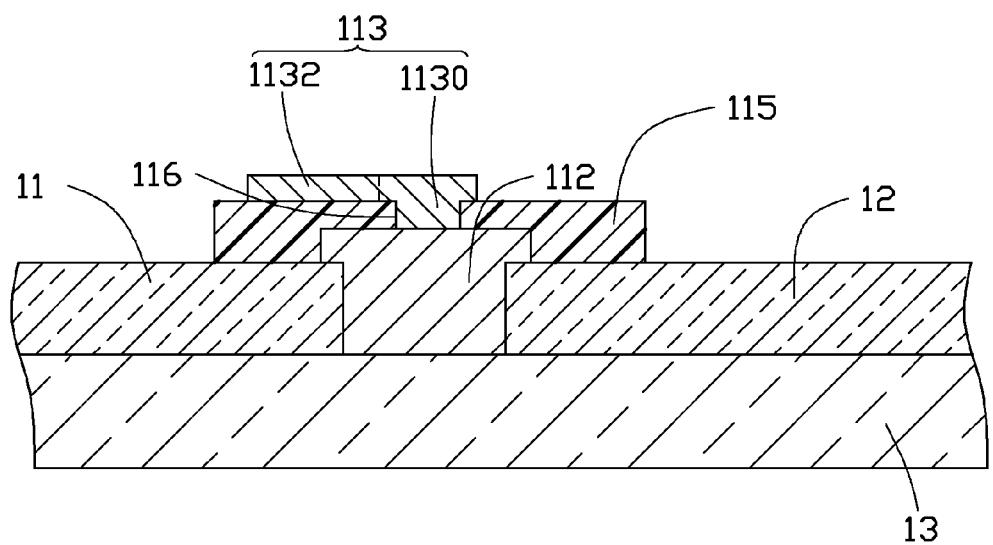
FIG. 4 is a partial, cross-sectional view of the CNT touch panel of FIG. 1, showing an alternative gap region.

Alternatively, FIG. 4 shows that the first electrode 112 may be formed on the base 13, with two ends partly covering the first CNT film 11 and the second CNT film 12 correspondingly. The insulation layer 115 covers the first electrodes 112. Each first electrode 112 is located below a conductive hole 116 in the insulation layer 115. The first wire body 113 is formed on the insulation layer 115, with the connection portion 1130 being above the first electrode 112 and is electrically connected to the first electrode 112 via a corresponding conductive hole 116.

Moreover, because the first connection wires 111 are formed in the touch area, in the present disclosure, the first electrode 112 and the first wire body 113 can be made of transparent conductive material, for example, Indium Tin Oxide (ITO) or Indium Zinc Oxide (IZO); and the insulation layer 115 may also be made of transparent insulation material, such as silicon dioxide. Accordingly, the gap region 180 would not impact a display quality when CNT touch panel 10 is disposed on a display panel.

Each of the second connection wires 121 includes a third electrode 122, a second wire body 123 and a fourth electrode 124. The third electrode 122 is formed at the first side region 181 and is attached to the first CNT film 11; each of the third electrodes 122 corresponds to one of the first electrodes 112, and two adjacent third electrodes 122 are also arranged in a particular interval. The fourth electrode 124 is formed on the mounting region of the third side region 183, and is connected to the FPC 14. The second wire body 123 is connected between the third electrode 122 and the fourth electrode 124, for example, the second wire body 123 may start from the third electrode 122, extend through the first side region 181 and the third side region 183, and to reach the fourth electrode 124.

Each of the third connection wires 131 includes a fifth electrode 132, a third wire body 133 and a sixth electrode 134. The fifth electrode 132 is formed at the second side region 182 and is attached to the second CNT film 12; each of the fifth electrodes 132 corresponds one of the first electrodes 112, and two adjacent fifth electrodes 132 are also arranged in a particular interval. The sixth electrode 134 is formed on the mounting region of the third side region 183, and is connected to the FPC 14. The third wire body 133 is connected between the fifth electrode 132 and the sixth electrode 134, for example, the third wire body 133 may start from the fifth electrode 132, extend through the second side region 182 and the third side region 183, and reach the sixth electrode 134.

In the mounting region of the third side region 183, the second electrodes 114, the fourth electrodes 124 and the sixth electrodes 134 are arranged in parallel, in which the fourth electrodes 124 and the sixth electrodes 134 are correspondingly located at opposite sides of the second electrodes 114. The FPC 14 includes a plurality of connection electrodes, which are also arranged in parallel, each of the connection electrodes is correspondingly attached to one of the second electrodes 114, the fourth electrodes 124, or the sixth electrodes 134.

When the touch display apparatus 10 is in operation, scanning signals may be provided to the first CNT film 11 and the second CNT film 12 via the connection wires 111, 121, 131, and the first CNT film 11 and the second CNT film 12 may generate touch signals in response to touches applied thereto. The touch signals may further be transmitted to the FPC 14 via the connection wires 111, 121, 131, and then be received by a processing unit to determine coordinates of the touches.

In the foregoing CNT touch panel 10, the first CNT film 11 and the second CNT film 12 are placed in parallel on the base 13, the first CNT film 11 and the second CNT film 12 cooperatively form a large size CNT layer without the need of growing or creating very long CNT units. As such, the functions of the touch display apparatus 10 as provided in the present embodiment are equal to those of a larger touch display apparatus.

Moreover, because the first CNT film 11 and the second CNT film 12 share the first electrodes 112, the touch-insensitive gap between the first CNT film 11 and the second CNT film 12 can be narrower, which maintains the touch sensing performance of the CNT touch panel 10.

Figure 5:
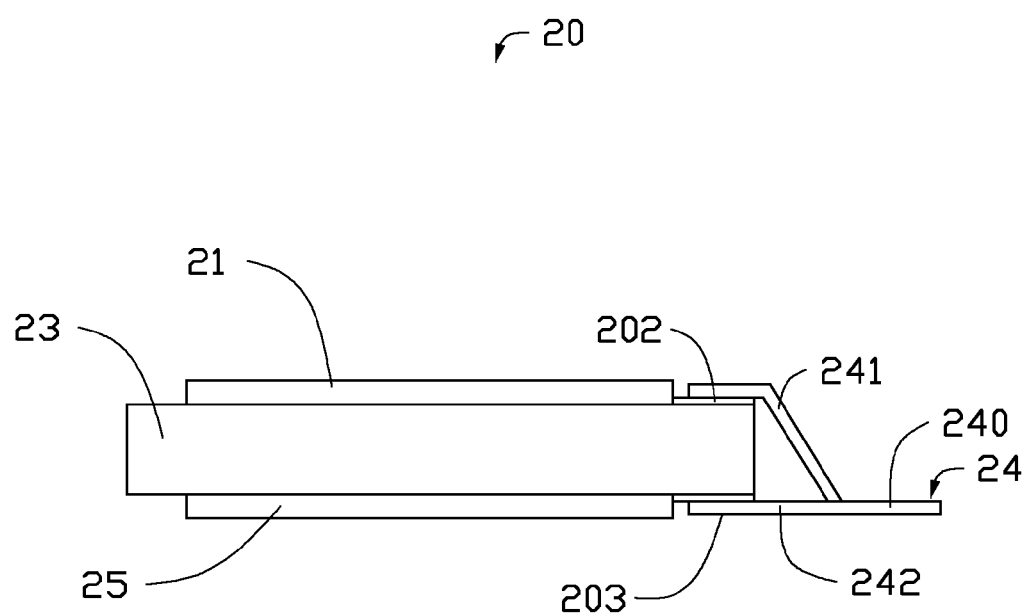
FIG. 5 is a schematic side view of a CNT touch panel according to a second embodiment of the present disclosure, the CNT touch panel including a transparent conductive layer.

FIG. 5 shows a CNT touch panel 20 according to a second embodiment of the present disclosure. The CNT touch panel 20 includes a CNT layer 21, a transparent conductive layer 25, a base 23, and an FPC 24. The base 23 is an insulation base 23, and includes a top surface and a bottom surface; a plurality of connection wires 202 and 203 are respectively formed on the top surface and the bottom surface of the base 23. The CNT layer 21 is adhered to the top surface of the base 23, and is connected to the connection wires 202. The transparent conductive layer 25 is adhered to the bottom surface of the base 23, and is connected to the connection wires 203.

The FPC 24 includes a main body 240, a first flexible branch 241 and a second flexible branch 242, the first flexible branch 241 and the second flexible branch 242 both extend from a same end of the main body 240 to form a Y-shaped structure. The first flexible branch 241 is mounted onto an edge of the top surface of the base 23, and is connected to the connection wires 202; the second flexible branch 242 is mounted onto an edge of the bottom surface of the base 23, and is connected to the connection wires 203.

Figure 6:
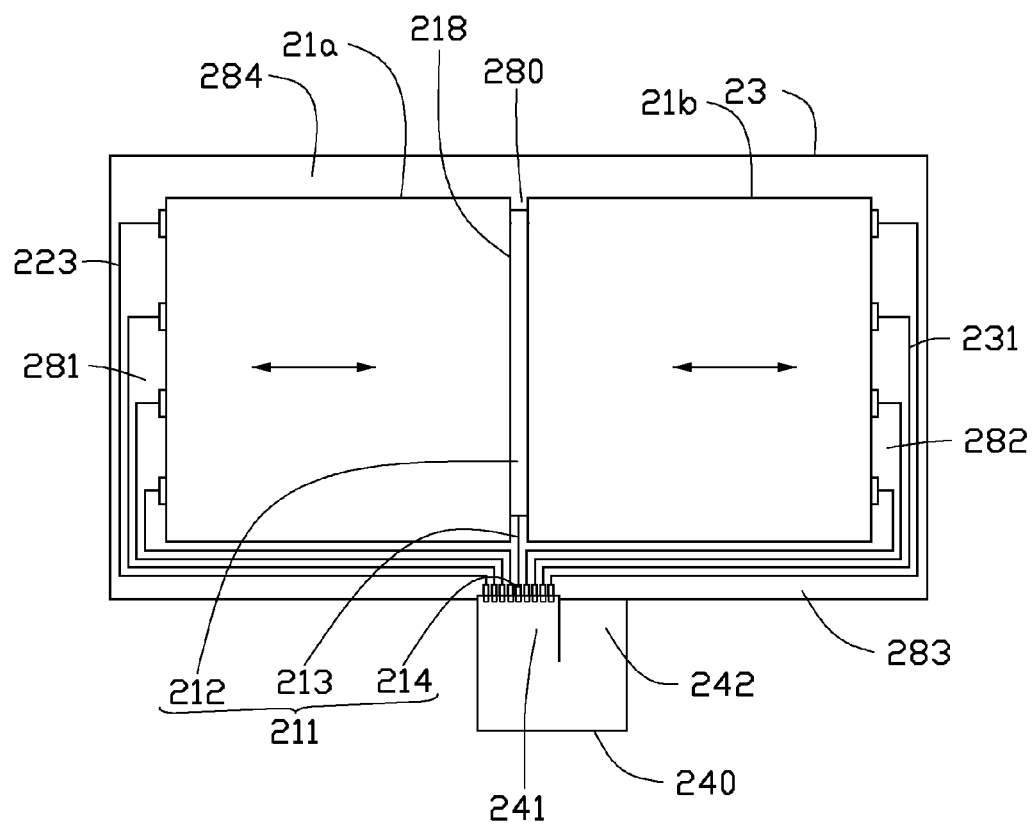
FIG. 6 is a top, plan view of the CNT touch panel of FIG. 5.

FIG. 6 shows that the CNT layer 21 includes a first CNT film 21a and a second CNT film 21b, the connection wires 202 include a first connection wire 211, a plurality of second connection wires 221, and a plurality of third connection wires 223 formed on wiring region on the base 23. Configurations of the base 23, the first CNT film 21a, the second CNT film 21b, the second connection wires 221 and the third connection wires 231 are similar to that of the base 13, the first CNT film 11, the second CNT film 12, the first connection wires 111, the second connection wires 121 and the third connection wires 131 in the CNT touch panel 10 as provided in the foregoing embodiment, however, in the present embodiment, only one first connection wire 211 is included in the CNT touch panel 20.

The first connection wire 211 includes a first electrode 212, a first wire body 213 and a second electrode 214. The first electrode 212 is a lengthwise transparent electrode extending from a top end of a gap region 280 to a bottom end of the gap region 280, and the first electrode 212 is connected to both the first CNT film 21a and the second CNT film 21b. The second electrode 214 is formed at a middle edge of a third side region 283 of the base 23. The first wire body 213 is formed on the third side region 283 of the base 23 and is connected between the first electrode 212 and the second electrode 214.

Figure 7:
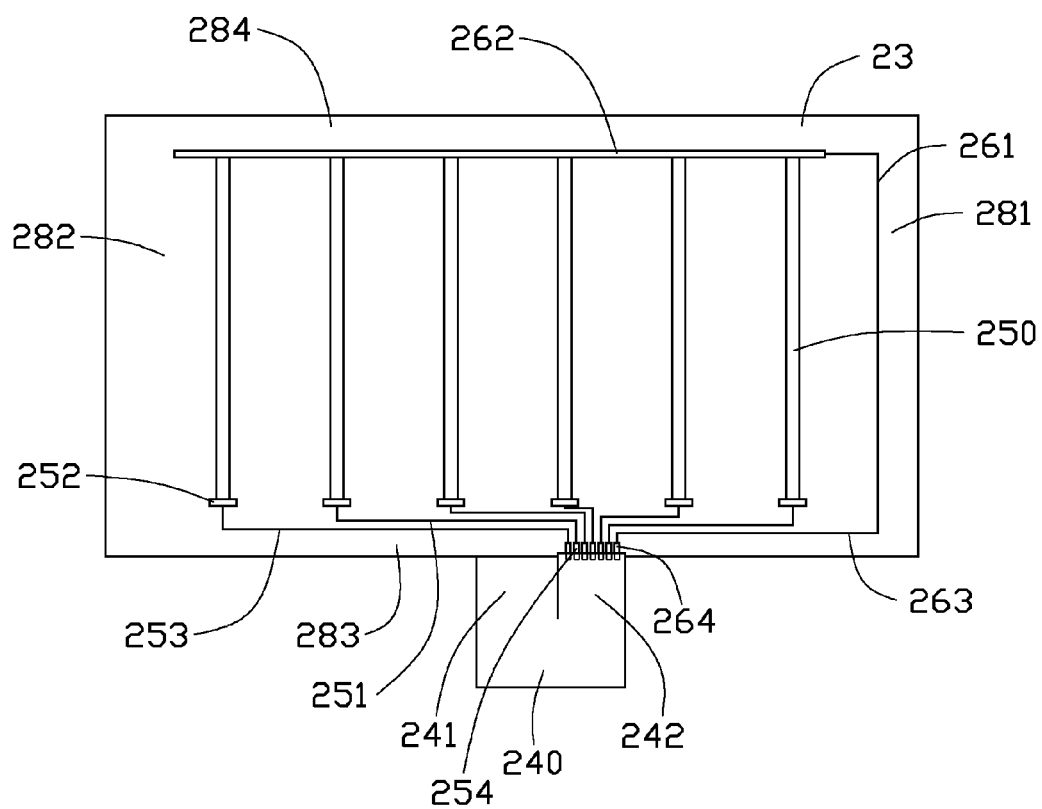
FIG. 7 is a bottom, plan view of the CNT touch panel of FIG. 5, showing the transparent conductive layer.

FIG. 7 shows that the transparent conductive layer 25 includes a plurality of lengthwise transparent electrodes 250, and the connection wires 203 include a plurality of fourth connection wires 251 and a fifth connection wire 261. The transparent electrodes 250 are arranged in parallel, and extend in a direction from the third side region 283 to a fourth side region 284.

Each of the fourth connection wires 251 includes a seventh electrode 252, a fourth wire body 253, and an eighth electrode 254. The seventh electrode 252 is formed on the third side region 283, and is attached to an end of the transparent electrode 250 in the third side region 283; the eighth electrode 254 is formed at the edge of the third side region 283, and is attached to the second flexible branch 242 of the FPC 24; the fourth wire body 253 is also formed on the third side region 283, and is connected between the seventh electrode 252 and the eighth electrode 254.

The fifth connection wire 261 includes a ninth electrode 262, a fifth wire body 263 and a tenth electrode 264. The ninth electrode 262 is a lengthwise electrode formed at the fourth side region 284, and is attached to ends of all the transparent electrodes 250; the tenth electrode 264 is also formed at the edge of the third side region 283, and is attached to the second flexible branch 242 of the FPC 24. The fifth wire body 263 is connected between ninth electrode 262 and the tenth electrode 264, for example, the fifth wire body 263 may start from the ninth electrode 262, and extend through the fourth side region 284, a first side region 281 and the third side region 283, to reach the tenth electrode 264. The tenth electrode 264 and the eighth electrodes 254 are arranged in parallel.

The transparent electrodes 250 of the transparent conductive layer 25 can be made of transparent conductive material such as ITO or IZO; the fourth connection wires 251 and the fifth connection wire 261 may also be made of the transparent conductive material.

In the CNT touch panel 20 according to the present embodiment, the CNT layer 21 and the transparent conductive layer 25 may cooperate to form a capacity touch structure that supports a multi-touch function, and accordingly, a touch performance of the CNT touch panel 20 is improved.

Figure 8:
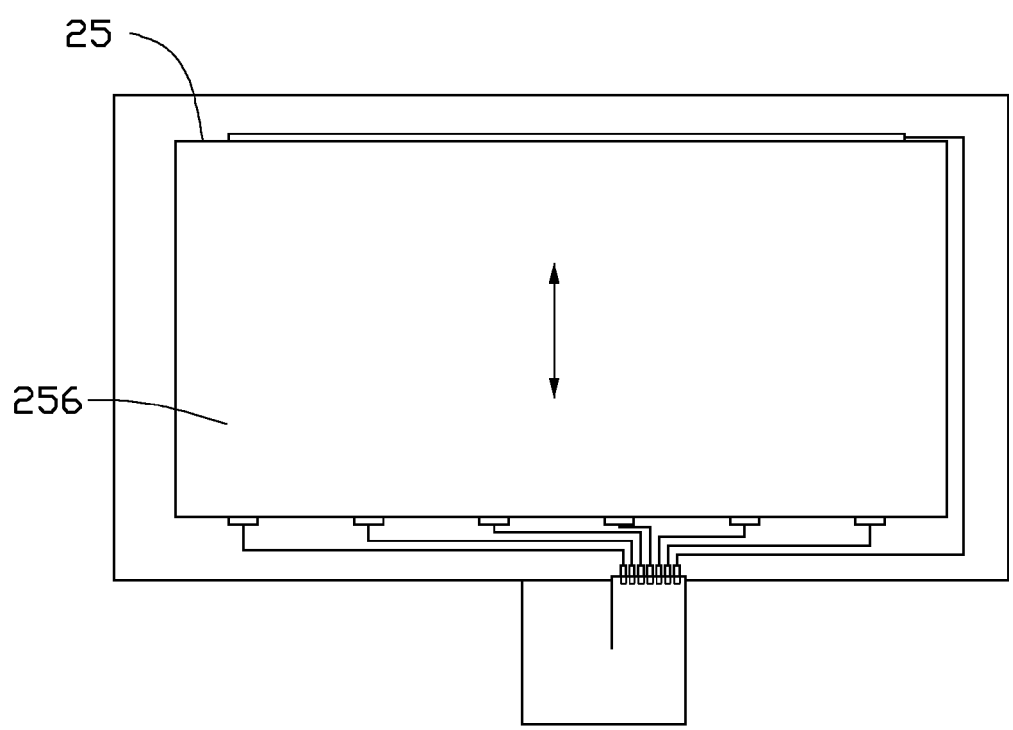
FIG. 8 is bottom, plan view of the CNT touch panel of FIG. 5, showing an alternative transparent conductive layer.

Alternatively, FIG. 8 shows that the transparent conductive layer 25 may include a bottom CNT layer 256 adhered to a touch area in the bottom surface of the base 23. The bottom CNT layer 256 may have a configuration substantially same as the CNT layer 21 on the top surface of the base 23, but an orientation of CNT units in the bottom CNT layer 256 is perpendicular to CNT units in the CNT layer 21.

Figure 9:
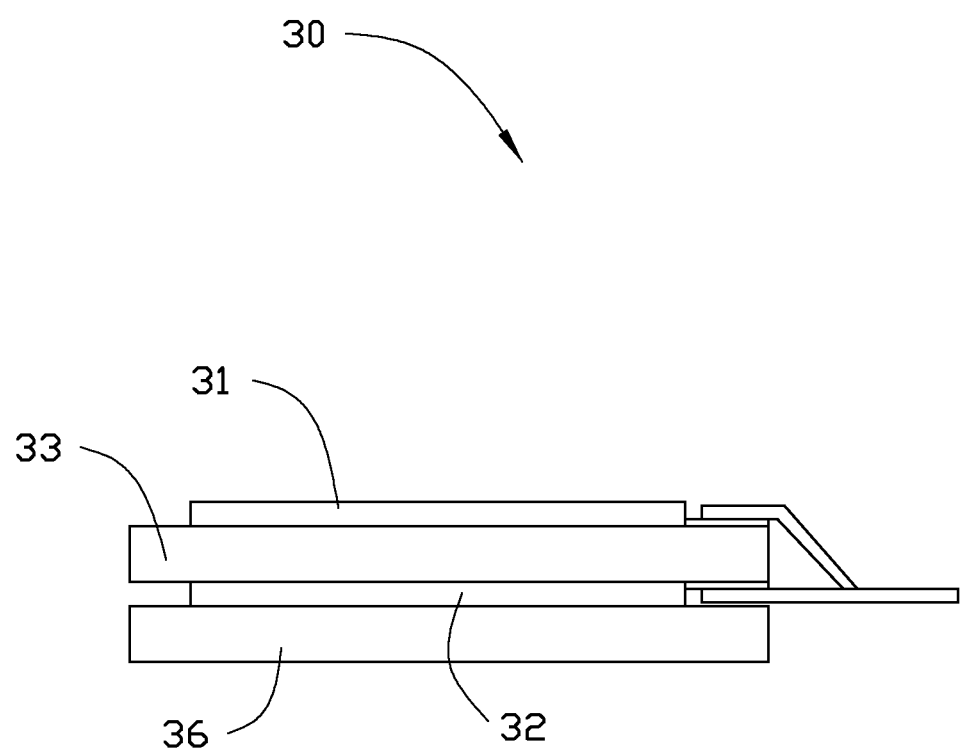
FIG. 9 is a schematic side view of a CNT touch panel according to a third embodiment of the present disclosure.

FIG. 9 shows a CNT touch panel 30 according to a third embodiment of the present disclosure. The CNT touch panel 30 is similar to the above-described CNT touch panel 20, but with differences: a transparent substrate 36 is provided in the CNT touch panel 30, and a transparent conductive layer 32, a base 33 and a CNT layer 31 are positioned on the transparent substrate 36 in that order from bottom to top.

In other alternatively embodiments, the bases 23 in the above-described CNT touch panel 20 may be replaced by a spacer layer, as such, the CNT layers 21 and the transparent conductive layer 25 may cooperatively form a resistor touch structure. Furthermore, the fifth connection wire 261 in the above-described CNT touch panel 20 may be removed, and thus an end of the transparent conductive layer 25 adjacent to the fourth side region 284 is floated. The FPC 24 may use two separate sub-FPCs instead of the two flexible branches 241 and 242.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A carbon nanotube (CNT) touch panel, comprising:
a base defining a touch area comprising a first touch sensing region, a second touch sensing region, and a gap region between the first touch sensing region and the second touch sensing region;
a CNT layer comprising a first CNT film and a second CNT film, the first CNT film positioned on the first touch sensing region, and the second CNT film positioned on the second touch sensing region; and
a FPC (flexible printed circuit) mounted on the base;
wherein at least one first connection wire is formed on the base, the at least one first connection wire comprises a first electrode, a first wire body and a second electrode; the first electrode is located at the gap region, both the first CNT film and the second CNT film are connected to the same first electrode, the second electrode is attached to the FPC, and the first wire body is connected between the first electrode and the second electrode.

2. The CNT touch panel of claim 1, wherein each of the first CNT film and the second CNT film comprises a plurality of CNT units arranged in parallel with each other, the CN tubes in the first CNT film have a same orientation as orientation of the CNT units in the second CNT film.

3. The CNT touch panel of claim 1, wherein an insulation layer is formed on the gap region, the first wire body is covered by the insulation layer, and the first electrode is located on the insulation layer, wherein the first electrode is connected to the first wire body via a conductive hole formed in the insulation layer.

4. The CNT touch panel of claim 3, wherein the first wire body comprises a connection portion and a transmission portion, the connection portion is located below the conductive hole and is connected to the first electrode via the conductive hole, the transmission portion is connected between the connection portion and the second electrode.

5. The CNT touch panel of claim 1, wherein the first electrode is formed on the base, and an insulation layer is formed to cover the first electrode, and the first electrode is located below a conductive hole formed in the insulation layer; the first wire body is formed on the insulation layer and is connected to the first electrode via the conductive hole.

6. The CNT touch panel of claim 5, wherein the first wire body comprises a connection portion and a transmission portion, the connection portion is located above the first electrode and is connected to the first electrode via the conductive hole, the transmission portion is connected between the connection portion and the second electrode.

7. The CNT touch panel of claim 1, wherein the base further defines a first side region, a second side region, a third side region and a fourth side region arranged end to end to surround the touch area; the first side region and the second side region are located adjacent to opposite ends of the touch area, and the third side region and the fourth side region are located adjacent to the other two ends of the touch area, wherein the FPC is mounted on a predetermined mounting region of the third side region.

8. The CNT touch panel of claim 7, wherein the at least one first connection wire comprises only one first connection wire, and the first electrode of the first connection wire is an electrode extending from a top end of a gap region to a bottom end of the gap region.

9. The CNT touch panel of claim 7, wherein the at least one first connection wire comprises a plurality of first connection wires, each of the first connection wires is insulated from other connection wires, and first electrodes of two adjacent first connection wires are arranged in a particular interval.

10. The CNT touch panel of claim 9, further comprising a plurality of second connection wires, wherein each of the second connection wires comprises a third electrode, a second wire body and a fourth electrode, the third electrode is formed at the first side region and is attached to the first CNT film, the fourth electrode is formed at the mounting region in the third side region, and the second wire body is connected between the third electrode and the fourth electrode.

11. The CNT touch panel of claim 10, further comprising a plurality of third connection wires, wherein each of the third connection wires comprises a fifth electrode, a third wire body and a sixth electrode, the fifth electrode is formed at the second side region and is attached to the second CNT film, the sixth electrode is formed at the mounting region in the third side region, and the third wire body is connected between the third electrode and the fourth electrode.

12. The CNT touch panel of claim 11, wherein each third electrode corresponds to a first electrode, and each fifth electrode also corresponds to a first electrode.

13. The CNT touch panel of claim 7, further comprising a transparent conductive layer, wherein the CNT layer is a top CNT layer formed on a top surface of the base, and the transparent conductive layer is formed on a bottom surface of the base.

14. The CNT touch panel of claim 13, wherein the FPC comprises a main body, a first flexible branch and a second flexible, the first flexible branch and the second flexible branch extend from a same end of the main body to form a Y-shaped structure; the first flexible branch is mounted on the top surface of the base and is connected to the CNT layer, and the second flexible branch is mounted on the bottom surface of the base and is connected to the transparent conductive layer.

15. The CNT touch panel of claim 14, wherein the transparent conductive layer comprises a plurality of lengthwise transparent electrodes arranged in parallel; each transparent electrode extends in a direction from the third side region to the fourth side region of the base.

16. The CNT touch panel of claim 15, further comprising a plurality of fourth connection wires formed on the bottom surface of the base, each of the fourth connection wires comprises a seventh electrode, a fourth wire body and an eighth electrode, the seventh electrode is formed on the third side region and is attached to the transparent electrode, the eighth electrode is formed on the mounting region and is attached to the first flexible branch of the FPC, the fourth wire body is connected between the seventh electrode and the eighth electrode.

17. The CNT touch panel of claim 16, further comprising a fifth connection wires formed on the bottom surface of the base, the fifth connection wires comprises a ninth electrode, a fifth wire body and an tenth electrode, the ninth electrode is a lengthwise electrode formed at the fourth side region and is attached to all the transparent electrodes, the tenth electrode is formed on the mounting region and is attached to the first flexible branch of the FPC, the fifth wire body is connected between the ninth electrode and the tenth electrode.

18. The CNT touch panel of claim 13, wherein the transparent conductive layer is a bottom CNT layer adhered to a touch area in the bottom surface of the base; each of the top CNT layer and the bottom CNT layer comprises a plurality of CNT units, and an orientation of the CNT units in the bottom CNT layer is perpendicular to the CNT units in the top CNT layer.

19. The CNT touch panel of claim 13, wherein the base is a spacer layer between the CNT layer and the transparent conductive layer.

20. The CNT touch panel of claim 13, further comprising a transparent substrate, wherein the transparent conductive layer, the base and the CNT layer are positioned on the transparent substrate in that order from bottom to top.

* * * * *